US007606793B2

(12) United States Patent
Merrigan et al.

(10) Patent No.: US 7,606,793 B2
(45) Date of Patent: Oct. 20, 2009

(54) SYSTEM AND METHOD FOR SCOPING SEARCHES USING INDEX KEYS

(75) Inventors: Chadd Creighton Merrigan, Redmond, WA (US); Kyle G. Peltonen, Issaquah, WA (US); Dmitriy Meyerzon, Bellevue, WA (US); David J. Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 10/951,123

(22) Filed: Sep. 27, 2004

(65) Prior Publication Data

US 2006/0074865 A1  Apr. 6, 2006

(51) Int. Cl.
*G06F 7/00* (2006.01)
*G06F 17/30* (2006.01)
(52) U.S. Cl. .................. 707/3; 707/1; 707/2; 707/6; 707/102; 707/200
(58) Field of Classification Search ............ 707/1–3, 707/8, 6, 102, 200
See application file for complete search history.

(56) References Cited

U.S. PATENT DOCUMENTS

| 6,199,081 B1* | 3/2001 | Meyerzon et al. ........... 715/513 |
| 6,324,551 B1* | 11/2001 | Lamping et al. ............ 715/500 |
| 6,360,215 B1* | 3/2002 | Judd et al. ..................... 707/3 |
| 6,598,040 B1 | 7/2003 | Cragun et al. |
| 6,772,141 B1* | 8/2004 | Pratt et al. ..................... 707/3 |
| 6,898,592 B2 | 5/2005 | Peltonen et al. |
| 2002/0083054 A1* | 6/2002 | Peltonen et al. ................ 707/5 |
| 2003/0101183 A1* | 5/2003 | Kabra et al. .................... 707/8 |
| 2004/0249795 A1* | 12/2004 | Brockway et al. .............. 707/3 |
| 2004/0267722 A1* | 12/2004 | Larimore et al. ............... 707/3 |
| 2005/0154710 A1* | 7/2005 | Ruhlow et al. ................. 707/3 |

OTHER PUBLICATIONS

Mittal et al., "Framework for Synthesizing Semantic-Level Indices", Multimedia Tools and Applications Jun. 2003. vol. 20,Iss.2, pp. 1-24. Download: http://www.springerlink.com/content/tv632274r1267305/fulltext.pdf.*
Bohm et al., "Multidimensional Index Structures in Relational Databases", Journal of Intelligent Information Systems Jul. 2000. vol. 15,Iss.1, pp. 1-20. Dowload: http://www.springerlink.com/content/n345270t27538741/fulltext.pdf.*

* cited by examiner

*Primary Examiner*—John E Breene
*Assistant Examiner*—Hares Jami
(74) *Attorney, Agent, or Firm*—Merchant & Gould, P.C.

(57) ABSTRACT

A set of index keys is included in an index search system that are associated with the scope of the search rather than the content of the documents that are the target of the search. These scope related index keys, or scope keys allows the scope of the search to be selected, reducing the number of documents that a search is required to sift through to obtain results. Furthermore, compound scopes are recognized and stored such that an index of complex search scopes is provided to eliminate rehashing of the searches based on these complex search scopes.

17 Claims, 7 Drawing Sheets

US 7,606,793 B2

SYSTEM AND METHOD FOR SCOPING SEARCHES USING INDEX KEYS

BACKGROUND OF THE INVENTION

Searches among networks and file systems for content have been provided in many forms but most commonly by a variant of a search engine. A search engine is a program that searches documents for specified keywords and returns a list of the documents where the keywords were found.

Typically, a search engine works by sending out a spider to fetch as many documents as possible. Another program, called an indexer, then reads these documents and creates an index based on the words contained in each document. An index is a list of keys or keywords, each of which identifies a unique record. Indices make it faster to find specific records and to sort records by the index field. A search engine uses an algorithm to create its indices such that, ideally, only meaningful results are returned for each query by a client or user.

A fairly consistent aspect of these queries is the use of a keyword or index key. Whether a user enters a search query as a long text string or a connection of Boolean operators, the search engine examines all records for the keywords entered corresponding to documents that match the keywords. A subset of the records is then returned that satisfies the Boolean operator constraints or corresponds to the long text string. Examining these records can be a time consuming and expensive operation. In addition, a client may not desire a full record search for documents containing a particular keyword.

SUMMARY OF THE INVENTION

Embodiments of the present invention are related to a system and method that solves for the above mentioned limitations by providing a class of index keys, referred to as scope keys, that define a scope of the search rather than merely providing a keyword. When a scope key is entered in a search query, the scope key limits the scope of the index records searched. For example, a scope key can limit the scope of a search by limiting the search results to a certain file type, such as .mpg files. Another scope key can limit the scope of search according to a URL (Uniform Resource Locator) so that only documents under that URL are searched. Still another scope key may limit the scope of the search to a particular database on the user's computer or other networked computer. The present invention therefore solves the above-mentioned problem by significantly reducing the time and expense of a search by allowing the user to limit the scope for the search using a particular class of index keys.

In accordance with another aspect of the present invention, compound scopes are also recognized and stored. This additional index partition includes scope definitions that are combinations of the basic scopes. The documents corresponding to these compound scopes have already been resolved, allowing for faster searches when these compound scopes are referenced.

BRIEF DESCRIPTION OF THE INVENTION

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
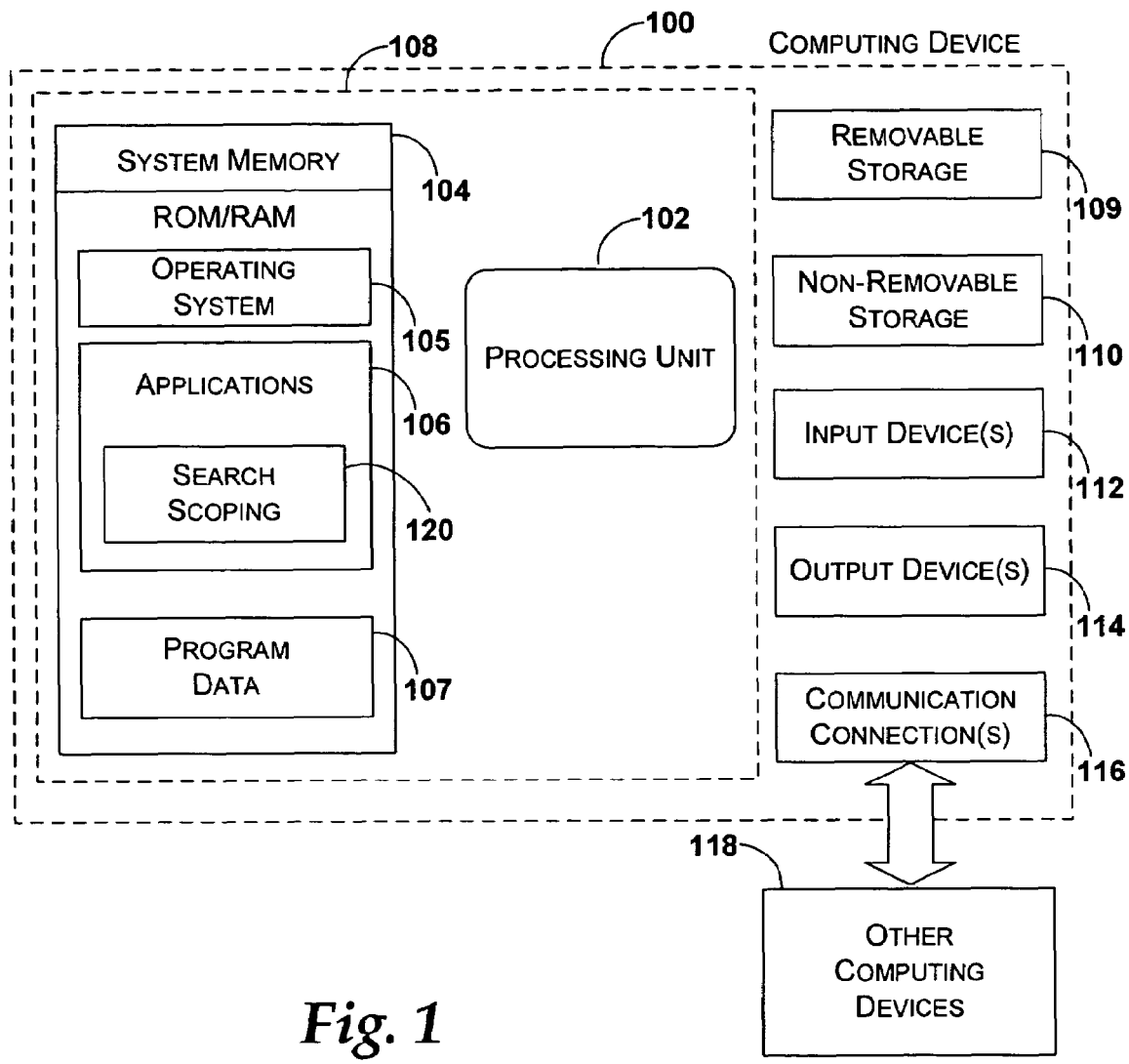
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search scoping application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Scoping Searches

Throughout the following description and the claims, the term "document" refers to any possible resource that may be returned as the result of a search query or crawl of a network, such as network documents, files, folders, web pages, and other resources. The term "index key" refers to any keyword or key associated with a search that is used to target a set of documents in a search query or creation of an index. The term "scope key" refers to any index key that may be used to narrow the scope of the search such that the number of documents to be searched is reduced before the search is commenced. The scope of the search can be narrowed according to attributes such as file types, locations such as certain databases or URLs, or by other criteria that reduces the number of documents to be searched.

Embodiments of the present invention are related to increasing the query efficiency of all scoped queries by representing the scopes of each item in the index with scope keys and adding the appropriate scope key to the query as another restriction. This method is provided in contrast to a method that re-calculates the scope condition for every document matching the user keywords based on document properties (e.g., URL or other metadata). Since most scopes will represent a narrow slice of the set of all crawled items, the efficiency of scoped queries is increased by a factor less than but related to the narrowness of that slice. In one example, an administrator of a portal (i.e., a web site that offers a host of services including searches) may determine that the users of the portal are especially interested in functional specs. It may therefore be advantageous to provide a search mechanism that only searches through these specs for keywords without sifting through the chaff of those words in other documents. Through an administrative interface the administrator may define a scope having a rule: profile="spec", or this scope may already be defined as a basic scope. The administrator may use the basic scope to define a compound scope having a rule: profile="spec" AND filetype="Text" AND author!="John Doe". After giving this scope a friendly name for the client's user interface, and specifying from which sites this scope is available, the scope appears in the drop-down scope list for clients. This scope selection returns only documents with that property value as query results. Scopes defined by an administrator in this manner may also be referred to as authored scopes.

In addition, several default scope selection may be available. A typical client may be presented with an option to search "all content", which simply indicates a non-scoped query. A scope selection for "this site" searches all documents on the current site and its subsites. A scope may also be generated that excludes certain results rather than simply identifying the scope for documents included within a particular subset. For example, a scope definition may correspond to a search for all document types except text (.txt) documents. Another scope definition may correspond to a search for all documents in a network except for those associate with a particular Web Site URL. The number of scope selections, whether default, authored, or otherwise are not limited to those described herein.

In another embodiment, a client is also given the option to enter scope keys directly into a search request. The scope key is given a name for ease of use by the client, typing the name into the search request limits the search by the associated scope.

Figure 2:
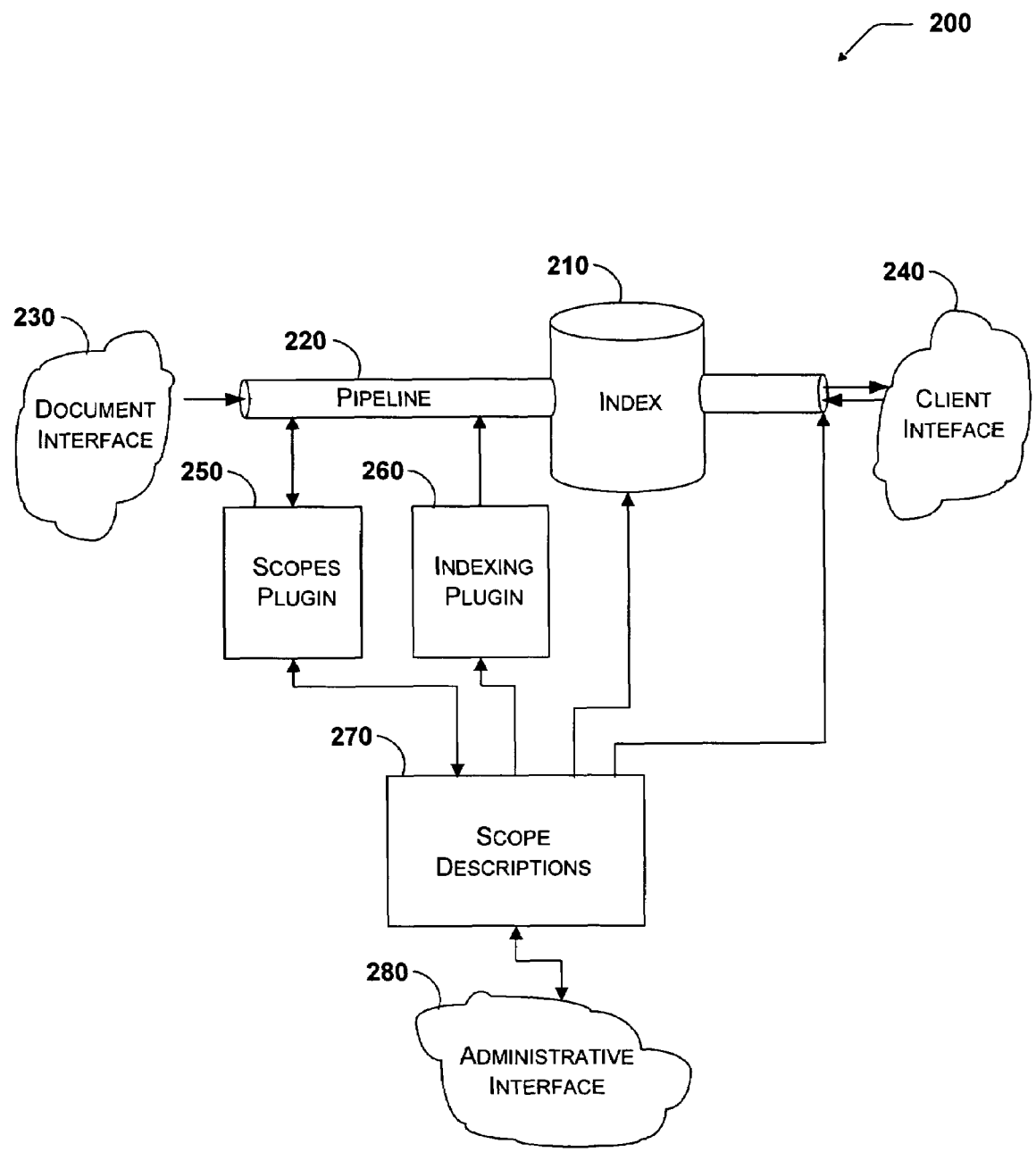
FIG. 2 illustrates a block diagram of an exemplary system for scoping searches using index keys in accordance with the present invention.

FIG. 2 illustrates a functional block diagram of an exemplary system for scoping searches using index keys in accordance with the present invention. System 200 includes index 210, pipeline 220, document interface 230, client interface 240, scopes plugin 250, indexing plugin 260, scope descriptions 270, and administrative interface 280.

Index 210 is structured to include separate indexes for the content keys (i.e., keywords) and for the scope keys. A more detailed description of the structure of index 210 is provided below in the discussion of FIG. 3. The records of these indexes are used in providing results to client queries. In one embodiment, index 210 corresponds to multiple databases that collectively provide the storage for the index records.

Pipeline 220 is an illustrative representation of the gathering mechanism for obtaining the documents or records of the documents for indexing. Pipeline 220 allows for filtering of data by various plugins (e.g., scopes plugin 250) before the records corresponding to the data are entered into index 210.

Document interface 230 provides the protocols, network access points, and database access points for retrieving documents across multiple databases and network locations. For example, document interface 230 may provide access to the Internet while also providing access to a database of a local server and access to a database on the current computing device. Other embodiments may access other document locations using a variety of protocols without departing from the spirit or scope of the invention.

Client Interface 240 provides access by a client to define and initiate a search. The search may be defined according to keywords and/or scope keys. An exemplary method for processing search queries is described in greater detail in the discussion of FIG. 7 below.

Scopes plugin 250 is one of several gatherer pipeline plugins. Scopes plugin 250 identifies property values that are to be reemitted as scope keys (i.e., items to be indexed in the scopes index). Those properties that are identified as interesting properties relative to scope (e.g., file types, URLs, etc.) are gathered by scope plugin 250 as the documents provided through document interface 230 are crawled. These properties are reemitted by scope plugin 250 into pipeline 220 to be included in index 210. These properties are also usable by an administrator or other entity for providing scope selections to a client according to these properties.

Indexing plugin 260 is another plugin connected to pipeline 220. Indexing plugin provides the mechanism for generating, partitioning, and updating index 210. An exemplary method for generating index 210 is described in greater detail in the discussion of FIG. 5 below. An exemplary method for updating index 210 is described in greater detail in the discussion of FIG. 6 below. In one embodiment, indexing plugin 260 provides word lists that temporarily cache the keywords and scope keys generated from crawled documents before flushing these results to index 210. The records of index 210 are populated from the crawl results included in these word lists.

Scope descriptions 270 provides tables that store information about the scopes. For example, scope descriptions 270 may include administrative information and internal information, such as scopes, scope rules, visibility, and other attributes corresponding to the scope related properties and scope selections generated for use in search queries. Scope descriptions 270 receives the properties for generating the scope selections through scope plugin 250. Scope descriptions 270 is also accessed by indexing plugin 260 for generation and organization of the scope index within index 210. Index 210 also accesses scope descriptions 270 for generation and update of the compound scope index (see FIGS. 3 and 4 below). Scope descriptions is also accessed at client interface 240, so that a client may select a scope for inclusion in a search query or select a scope selection to apply to a search.

Administrative interface 280 also access scope descriptions 270 to allow an administrator or other control mechanism (e.g., automated program) to take the properties provided by scopes plugin 250 and create the scope selections for use search queries. Administrative interface 280 may be provided according to any format that allows the creation of the scope selections and manipulation of the scope descriptions, (e.g., via Internet login access).

Despite the illustration in system 200 of one-way and two-way communications between functional blocks, any of these communication types may be changed to another type without departing from the spirit or scope of the invention (e.g., all communications may have an acknowledgment message requiring two-way rather than one-way communication).

Figure 3:
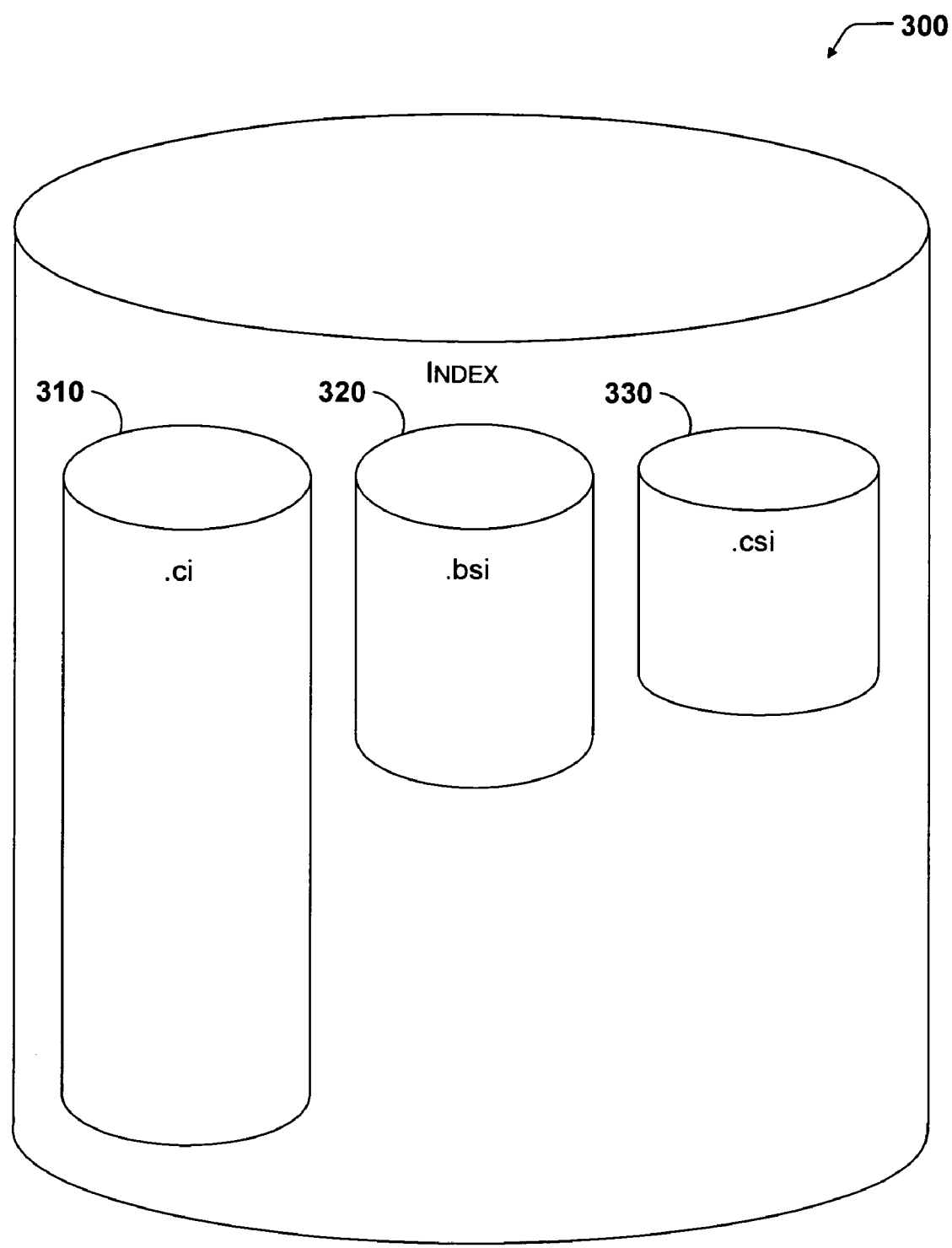
FIG. 3 illustrates a block diagram for an exemplary structure of an index in accordance with the present invention.

FIG. 3 illustrates a functional block diagram for an exemplary structure of an index in accordance with the present invention. Index 300 includes content index (.ci) 310, basic scopes index (.bsi) 320, and compound scopes index (.csi) 330.

Content index 310 includes records organized in an inverted index that lists documents that correspond to the keywords and other index keys used in the search query. The scope keys however, are diverted to basic scopes index 320.

Basic scopes index 320 includes records of documents that correspond to basic scopes. Basic scopes generally refer to scope selections that correspond to a singular scope related property of a document. For example, the numeric ID of a document crawled on site www.example.com would be recorded in the document list for a scope key which was composed by scopes plugin 250 to embody the property (site) and value ("example.com").

Compound scopes index 330 includes scopes that are generated from combinations of the basic scopes in basic scopes index 320. For example, a compound scope may includes records of documents that are a particular file type that are also related to a particular URL.

Figure 4:
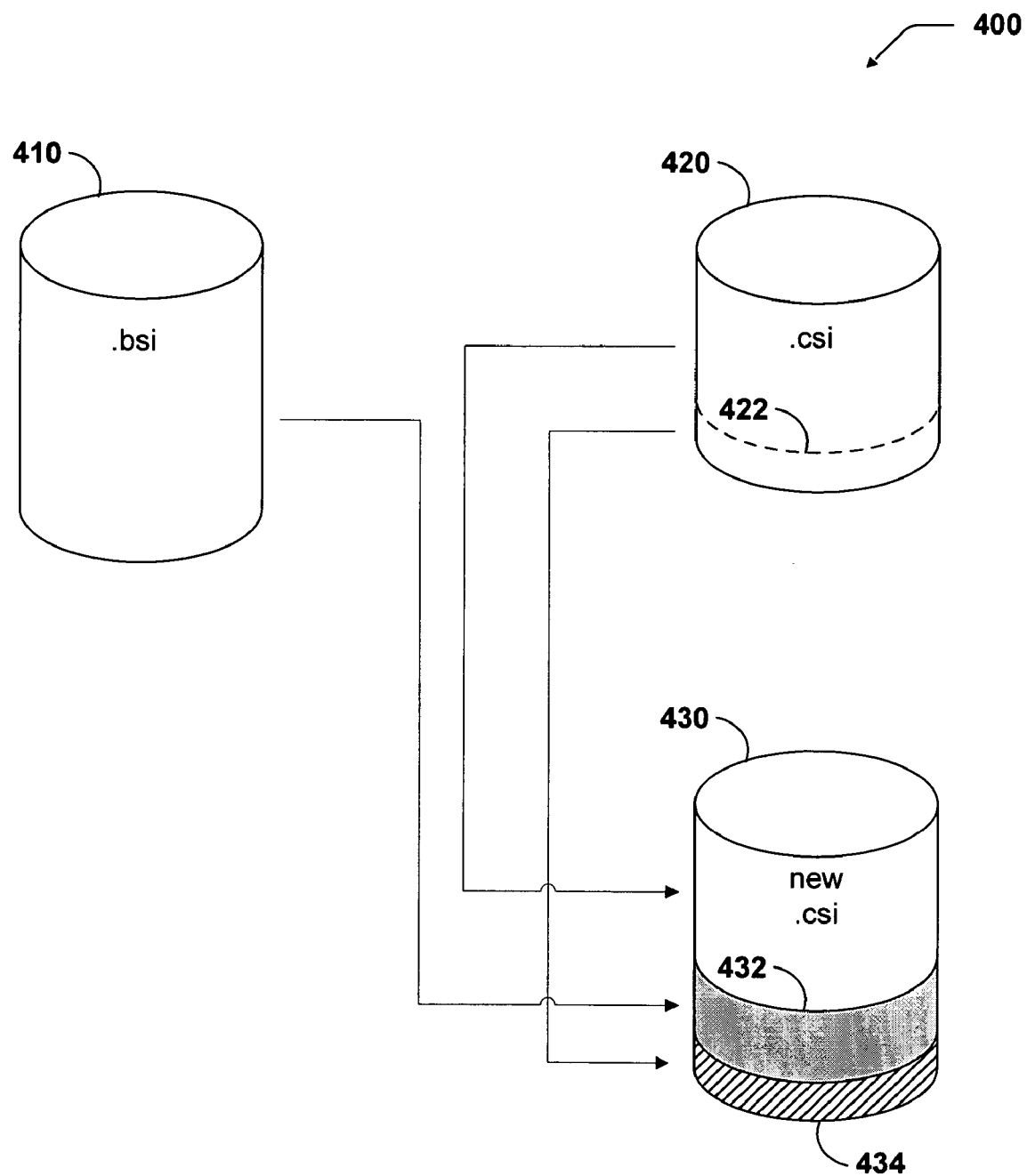
FIG. 4 illustrates an exemplary block diagram for managing compound scopes in accordance with the present invention.

FIG. 4 illustrates an exemplary block diagram for managing compound scopes in accordance with the present invention. Block diagram 400 includes basic scope index 410, original compound scopes index 420, and new compound scopes index 430.

When the basic scopes index is updated with additional basic scopes (see FIG. 6 below), the compound scopes index must also be updated. Position line 422 of original compound scopes index 420 illustrates the position where the new compound scopes should be included. A copy of original compound scopes index 420 is made, producing new compound scopes index 430. The copy of the original compound scopes index 420 is made until the position where the new compound scopes should be included is reached. New compound scopes 432 are then written into new compound scopes index 430. After new compound scopes 432 are included, copying of original compound scopes index 420 continues. The compound scopes 434 that follow new compound scopes 432 are copied from original compound scopes index 420 with an offset that compensates for the inclusion of new compound scopes 432.

Figure 5:
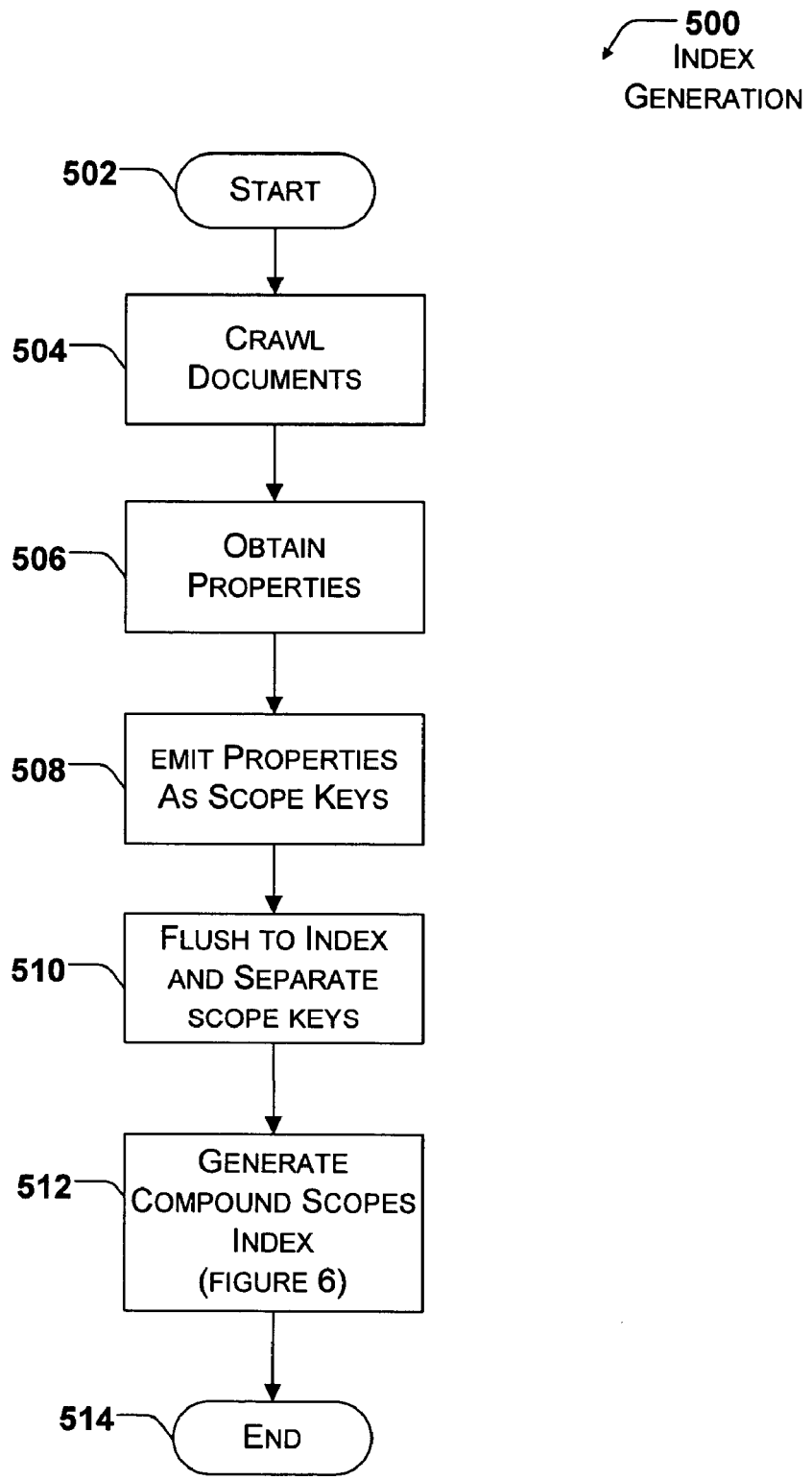
FIG. 5 illustrates a logical flow diagram of an exemplary process for generating an index in accordance with the present invention.

FIG. 5 illustrates a logical flow diagram of an exemplary process for generating an index in accordance with the present invention. Process 500 starts at block 502 where access is provided to a corpus of documents. Processing continues at block 504.

At block 504, the corpus of documents are crawled to determine the documents that exist as well as properties (e.g., file type) that are associated with those documents. An identifier or ID for each of the documents and their associated property are then forwarded as results of the crawl. Processing continues at block 506.

At block 506, the properties associated with the documents that relate to scope are obtained by a scopes plugin. The scopes plugin creates scope definitions from the properties. The scope definitions are usable by an administrator to create scope selections that allow a client to limit a search according to its scope. Processing moves to block 508.

At block 508, the scope definitions created from the obtained properties are emitted as scope keys amongst the results of the crawl. These scope keys operate similarly to the keywords and other index keys generated from the crawl, while being directed to the scope of the search rather than content of the documents. Some of the properties that are obtained for generating the scope keys include the document type, the URL of the document, the document's author, and other properties. The scope key is generated to include an identifier (ID) of the type of scope key and a text string that identifies the particular scope key. For example, if the ID for scope keys related URL is 237, then a scope key corresponding to the document in www.example.com would be "www.example.com". This scope key is emitted into the pipeline and is subsequently associated with the document in the index. Once the scope keys are emitted, processing continues at block 510.

At block 510, the scope keys, keywords, and other accumulated properties found in all the documents are flushed to the index. The flush writes the keys and properties to disk. During the flush, the scope keys are separated and sent to the basic scopes index, while the remaining data is sent to the content index. Processing continues at block 512.

At block 512, the compound scopes index is generated within the index. In one embodiment, the compound scopes index is generated in response to a compilation process that is commenced for the index. One exemplary process used for generating the compound scopes index is described in the discussion of FIG. 6 below. In one embodiment, compound scopes are defined by queries from clients. In another embodiment, a list of compound scopes is generated by an administrator before the index was instantiated. Once the compound scopes index is generated, processing continues to block 514, where process 500 ends.

In one embodiment, the basic scopes index is populated as the crawl is commenced, but the compound scopes index is not populated until the crawl is complete and the basic scopes index is fully built. Waiting to build the compound scopes index reduces overhead by reducing the queries to the basic scopes index.

Figure 6:
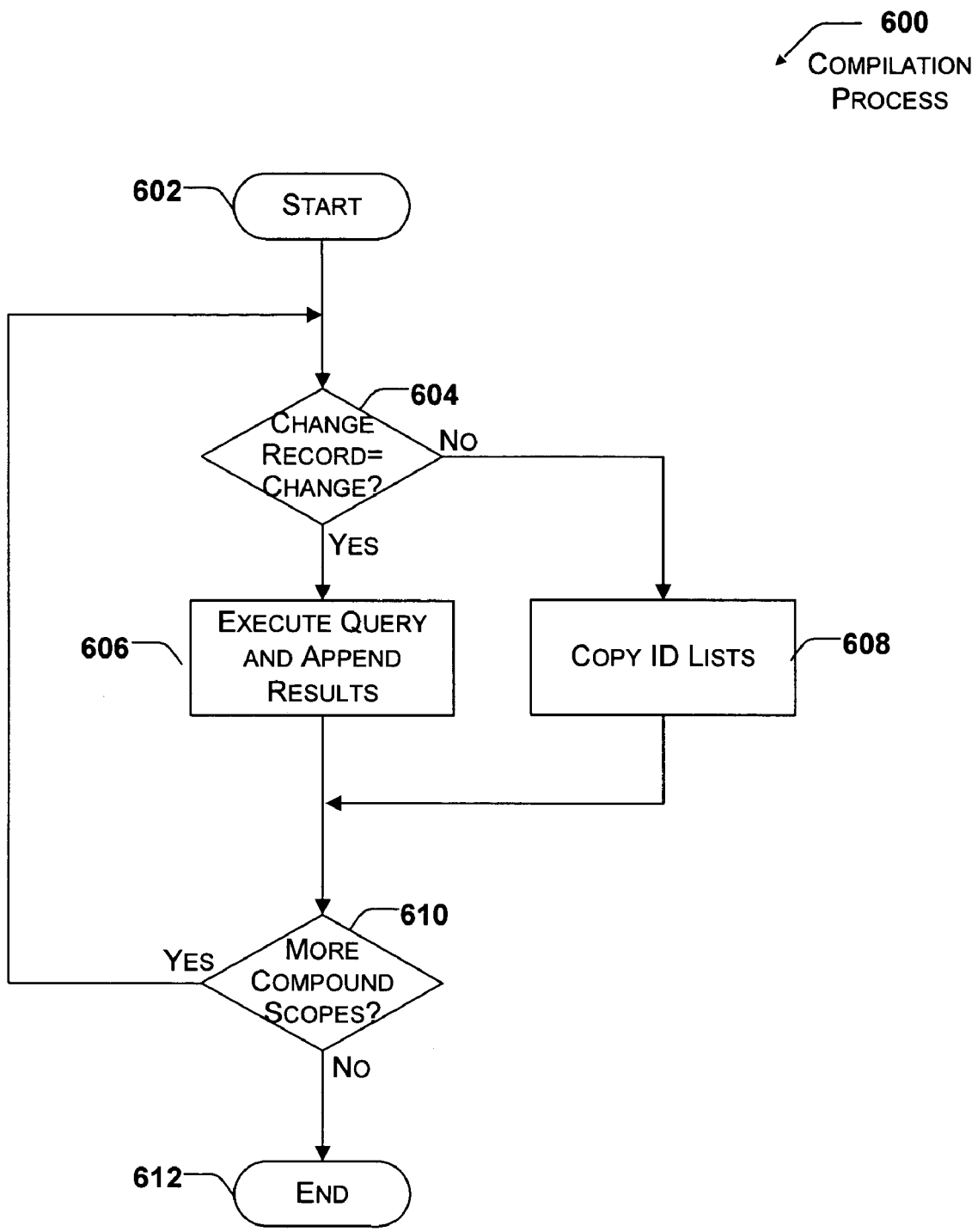
FIG. 6 illustrates a logical flow diagram of an exemplary process for compiling an index in accordance with the present invention.

FIG. 6 illustrates a logical flow diagram of an exemplary process for compiling an index in accordance with the present invention. Process 600 starts at block 602 where the compilation process is commenced. In one embodiment, process 600 is started asynchronously at a certain time interval (e.g., every 15 minutes) to update any existing compound scopes. In another embodiment, process 600 is started when process 500 of FIG. 5 enters block 512 to generate the compound scopes index from the newly generated basic scopes index. In still another embodiment, process 600 is commenced in response to other flushes to the index. Once process 600 is commenced, processing continues at decision block 604.

At decision block 604 a determination is made whether a change record corresponding to each scope within the compound scopes index indicates that the current compound scope has changed. In one embodiment, a similar process is used for generating the compound scopes index for the first time with a default setting that assumes all scopes have changed. Accordingly, generating a new compound scopes index and updating a compound scopes index are handled by the same compilation process. If the compound scope has changed, processing moves to block 406.

At block 606, a compilation process executes a query that is similar to a user query and allows the query process to update the list of documents corresponding to the scope in the compound scopes index. The list of documents is then appended to into compound scopes index as the compound scopes index is copied from its previous version (when a previous version exists). Processing continues at decision block 610.

Alternatively, if the change record indicates that the particular scope has not changed, processing moves to block 608. At block 608, the list of document IDs corresponding to the scope in the previous version of the compound scopes index is copied verbatim since the scope has not changed. Processing continues at decision block 610.

At decision block 610, a determination is made whether more compound scopes need to be copied to the new compound scopes index during the compilation process. If more compound scopes are to be copied, processing returns to decision block 610 to determine if the compounds scopes have changed. However, if no more compound scopes need to be transferred to the new compound scopes index, processing moves to block 612, where process 600 ends.

Updates to the corpus of documents may occur at any time. The document IDs for the corpus of documents are continually updated in an in-memory word list or multiple word lists. The population of the word list results from either initiated searches by clients, refresh actions that cause the corpus to be recrawled, or other various operations that lead to discovery of the change among the corpus of documents. When a document is changed (e.g., add, delete, modify), the document ID for the changed document is then forwarded to the in-memory word list along with the type of change. The word lists with the updated document IDs are then flushed to the index. The change to the document results in an update to the content index while the basic scopes index is also updated. Once the incremental crawl that discovered the change is complete, and the basic scopes index is updated, the compound scopes index is also updated to reflect the change to the documents on the network. Process 600 is used to reflect the updates in the compound scopes index independent of whether the update is a new document amongst the corpus of documents that are searched, a removal of a document from the corpus, or a modification to a document that effects the document's scope. By running the complication process asynchronously, every so often the compound scopes index is updated to reflect the changes to the documents on the network.

Figure 7:
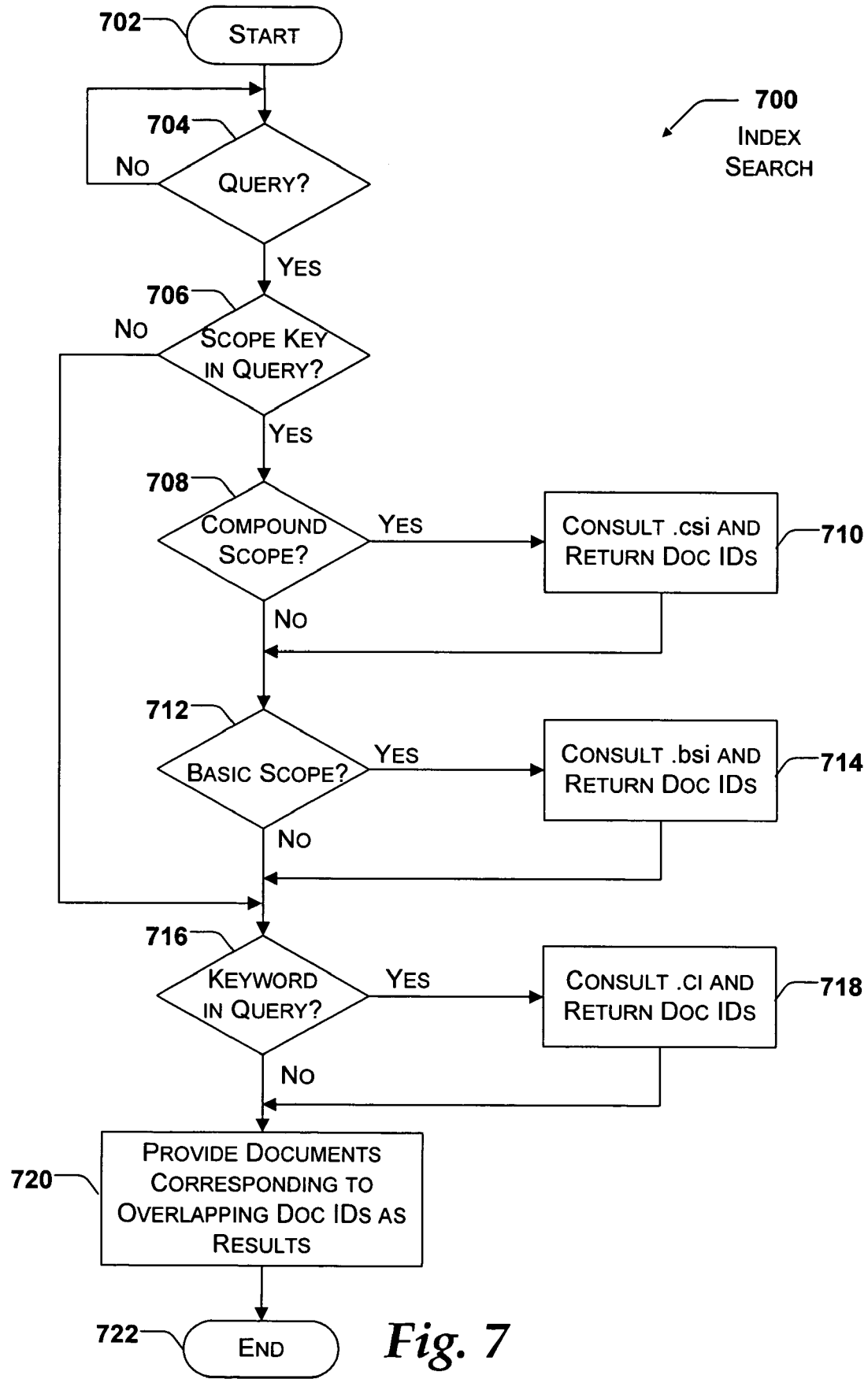
FIG. 7 illustrates a logical flow diagram of an exemplary process for handling a query in accordance with the present invention.

FIG. 7 illustrates a logical flow diagram of an exemplary process for handling a query in accordance with the present invention. Process 700 starts at block 702 where the index is instantiated and ready to accept a query from a client. Processing continues at decision block 704.

At decision block 704, a determination is made whether a search query has been initiated by a client. The client may correspond to a user that initiates a query or a program that is requesting the search. If a search has not been initiated, processing loops back onto block 704 while waiting for a search query to be initiated. However, once a search query is commenced, processing continues at decision block 706.

At decision block 706, a determination is made whether a scope key has been used in the search request. If there is no scope key present, processing advances to block 716. However, if a scope key is present in the search request, processing continues at decision block 708.

At decision block 708, a determination is made whether the instance of the scope key is as a portion of a compound scope. If the scope key is not used as part of a compound scope, processing advances to decision block 712. However, if the scope key is part of a compound scope, processing moves to block 710.

At block 710, the compound scopes index (.csi) is consulted for the documents identified by their document IDs as corresponding the compound scope included in the search query. The document IDs corresponding to these documents are then returned to be added to the search results pending the finalization of the search. Processing continues at decision block 712.

At decision block 712, a determination is made whether the instance of the scope key is as a portion of a compound scope. If the scope key does not correspond to a basic scope, processing advances to block 716. However, if the scope key does correspond to a basic scope, processing moves to block 714.

At block 714, the basic scopes index (.bsi) is consulted for the documents identified by their document IDs as corresponding the scope key included in the search query. The document IDs corresponding to these documents are then returned to be added to the search results pending the finalization of the search. Processing continues at decision block 716.

At decision block 716, a determination is made whether a keyword or other index key related to the content of documents is included in the search request. If a keyword is not included in the search request, processing advances to decision block 720. However if a keyword is included in the search request, processing moves to block 718.

At block 708, the content index (.ci) is consulted for the documents identified by their document IDs as corresponding the keyword included in the search query. In one embodiment, as the content index is search for the keyword, the search is limited to the scope previously defined according to the basic scopes index and/or the compound scopes index. The document IDs corresponding to these documents are then returned to be added to the search results pending the finalization of the search. Processing continues at decision block 710.

At block 720, the collection of document IDs for documents that overlapped in the different index partitions are returned as the query results. For example, the document ID may be correspond to a scope of the basic scopes index and also include a particular keyword. If the search request was limited by this particular scope and included the keyword, then the document ID would overlap between the index partitions. These overlapping IDs represent the results of the search. A pointer to each document included in the results can then be provided to the client in response to the search request. Typically, it is much faster to determine overlapping documents among indexes instead of consulting document properties to verify if the document is with an particular scope. Where document properties are generally located at random within a database, the index is clustered on a disk according to the keys (scope keys or keywords). The present invention therefore greatly increases the speed and ease by which a scope can be applied to a search query. Once the results are provided, processing moves to block 722, where process 700 ends.

In one embodiment, the process steps provided in operational blocks 708-718 are not sequential. Instead the basic scopes index or the compound scopes index or the content index are consulted based on the regular keys and scope keys of the query and the order they are consulted in depends on the sort order of the document IDs that correspond to the keys. In addition, the process steps provided in operational blocks 708-718 may need to be repeated multiple times as there may be multiple scopes, both compound scopes and basic scopes, included in a search query.

In another embodiment, the compound scopes index is updated with a new compound scope after each search request if a new compound scope is created by the request. The compound scopes index is updated according the method provided in the discussion of FIG. 4 above.

In still another embodiment, the scoped portion of a search request is a search selection made by the client. The search selection corresponds to a pre-selected scope of the results according to a list of scopes provided. This list of scopes may be generated by an administrator according to the scope definitions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for performing a search of a plurality of documents stored in a network of computing devices based on a query, the method comprising:
generating at least two scope-related index keys, wherein each of the scope-related index keys is generated according to a scope attribute of at least a portion of the plurality of documents;
generating one or more content-related index keys associated with a content of the plurality of documents, wherein the scope attribute is based on information other than the content of the plurality of documents;
generating one or more compound scope-related index keys associated with one or more combinations of the at least two scope-related index keys;
generating an index including:
a first document list identifying a first subset of the plurality of documents that correspond to the at least two scope-related index keys;
a second document list identifying a second subset of the plurality of documents that correspond to the one or more content-related index keys; and
a third document list identifying a third subset of the plurality of documents that correspond to the one or more compound scope-related index keys;
storing the index on at least one computing device in the network;
receiving a query that identifies at least one or more of: a first content-related index key of the one or more content-related index keys, a first scope-related index key of the at least two scope-related index keys, and a first compound scope-related index key of the one or more compound scope-related index keys; and
providing results to the query by:
in response to the query including the first scope-related index key, searching the first document list to identify one or more of the plurality of documents that correspond to the first scope-related index key;
in response to the query including the first content-related index key, searching the second document list to identify one or more of the plurality of documents that correspond to the first content-related index key;
in response to the query including the first compound scope-related index key, searching the third document list to identify one or more of the plurality of documents that correspond to the first compound scope-related index key; and
generating results to the query based on the searching of at least one or more of the first document list, the second document list, and the third document list.

2. The computer-implemented method of claim 1, wherein the combinations of the at least two scope-related index keys correspond to Boolean combinations.

3. The computer-implemented method of claim 1, farther comprising updating the third document list when a new combination of scope-related index keys is created by copying the third document list and inserting an additional subset of the plurality of documents that correspond to the new combination into the third document list to create an updated third document list.

4. The computer-implemented method of claim 1, further comprising updating the index when a new document is added to the plurality of documents, wherein updating the index comprises:
determining that the new document has the attribute of the first scope-related index key of the at least two scope-related index keys; and
adding a document identifier of the new document to the first document list key.

5. The computer-implemented method of claim 1, wherein generating the index further includes providing one or more document identifiers in the first, second, and third document lists, wherein each of the document identifiers identifies one of the plurality of documents.

6. The computer-implemented method of claim 1, further comprising generating a scope selection according to the at least two scope-related index keys such that the scope selection is selectable by a client for providing a scope to a client generated query.

7. The computer-implemented method of claim 1, further comprising providing an interface for manually generating and manipulating additional scope-related index keys from additional properties associated with additional search scopes of the documents.

8. A computer-readable storage medium that includes computer-executable instructions for performing a search of a plurality of documents based on a query, the instructions comprising:

generating one or more content-related index keys associated with a content of the plurality of documents;

generating at least two scope-related index keys according to one or more scope attributes of at least a portion of the plurality of documents, wherein the scope attributes are based on information other than the content of the plurality of documents;

generating one or more compound scope-related index keys associated with one or more combinations of the at least two scope-related index keys;

generating an index including:
    a content partition identifying a first subset of the plurality of documents that correspond to the one or more content-related index keys;
    a basic scope partition identifying a second subset of the plurality of documents that correspond to the at least two scope-related index keys; and
    a compound scope partition identifying a third subset of the plurality of documents that correspond to the one or more compound scope-related index keys;

storing the index on at least one computing device in the network;

receiving a query that identifies at least one or more of: a first content-related index key of the one or more content-related index keys, a first scope-related index key of the at least two scope-related index keys, and a first compound scope-related index key of the one or more compound scope-related index keys; and providing results to the query by:
    in response to the query including the first compound scope-related index key, searching the compound scope partition to identify one or more of the plurality of documents that correspond to the first compound scope-related index key;
    in response to the query including the first scope-related index key, searching the basic scope partition to identify one or more of the plurality of documents that correspond to the first scope-related index key;
    in response to the query including the first content-related index key, searching the content partition to identify one or more of the plurality of documents that correspond to the first content-related index key; and
    generating results to the query based on the searching of at least one or more of the compound scope partition, the basic scope partition, and the content partition.

9. The computer-readable storage medium of claim 8 further comprising instructions for updating the compound scope partition when a new combination of scope-related index keys is created by copying the compound scope partition to create a new compound scope partition while inserting a new document list into the new compound scope partition that corresponds to the new combination.

10. The computer-readable storage medium of claim 8, wherein the compound scope partition is updated asynchronously to an update of the content partition and the basic scope partition.

11. The computer-readable storage medium of claim 8, further comprising updating the index when an additional document is inserted amongst the plurality of documents that are queried, such that an additional document is included in the basic scope partition associated with the scope-related index key.

12. The computer-readable storage medium of claim 8, wherein the one or more documents identified in the content partition that correspond to the first content-related index key, the one or more documents identified in the basic scope partition that correspond to the first basic scope-related index key, and the one or more documents in the compound scope partition that correspond to the first compound scope-related index key are identified by a document identifier, wherein each document identifier corresponds to one of the plurality of documents.

13. The computer-readable storage medium of claim 8, further comprising generating a scope selection according to the at least two scope-related index keys such that the scope selection is selectable by a client for providing a scope to a client generated query.

14. The computer-readable storage medium of claim 8, further comprising providing an interface for manually generating and manipulating additional scope-related index keys from additional properties associated with additional search scopes of the documents.

15. The computer-implemented method of claim 1, wherein providing results to the query farther comprises determining a set of overlapping documents that are common to both the one or more of the plurality of documents that correspond to the first scope-related index key and the one or more of the plurality of documents that that correspond to the first content-related index key.

16. The computer-implemented method of claim 3, wherein the third document list is updated asynchronously to an update of the first document list and second the second document list.

17. The computer-readable storage medium of claim 12, wherein providing results to the query further comprises identifying a set of common document identifiers from the search of the content partition, the basic scope partition, and the compound scope partition.

* * * * *